United States Patent [19]

DeHart et al.

[11] Patent Number: 4,573,690

[45] Date of Patent: Mar. 4, 1986

[54] SEALING SURFACE AND METHOD

[75] Inventors: Arnold O. DeHart, Rochester; James D. Symons, Southfield, both of Mich.

[73] Assignee: General Motors Corporation, Detroit, Mich.

[21] Appl. No.: 681,380

[22] Filed: Dec. 13, 1984

[51] Int. Cl.⁴ .............................................. F16J 15/32
[52] U.S. Cl. ......................................... 277/1; 277/134
[58] Field of Search ................... 277/1, 133, 134, 152, 277/153

[56] References Cited

U.S. PATENT DOCUMENTS

| | | | |
|---|---|---|---|
| 3,572,730 | 3/1971 | Otto | 277/134 |
| 3,586,340 | 6/1971 | Otto | 277/134 |
| 4,331,336 | 5/1982 | Czernik et al. | 277/1 |
| 4,441,389 | 4/1984 | Symons | 72/53 |
| 4,495,689 | 1/1985 | McNeal et al. | 277/1 |

OTHER PUBLICATIONS

A Theory of Lubrication by Microirregularities by D. B. Hamilton, J. A. Walowit & C. M. Allen (Battelle Memorial Institute).
A Friction-Reducing Shaft Surface for Use With Standard Radial Sharp Lip Oil Seals by James D. Symons (GM Research publication).
Microasperity Lubrication by J. N. Anno, J. A. Walowit & C. M. Allen (Batelle Memorial Institute).

*Primary Examiner*—Robert I. Smith
*Attorney, Agent, or Firm*—Patrick M. Griffin

[57] ABSTRACT

An improved sealing surface configuration consists of a grid-like pattern of indentations formed into the surface, uniformly spaced to create a consequently uniformly spaced series of intermediate seal support pads. Each indentation includes a sloped wall converging with an adjacent pad in the direction of seal lip motion. The consequent hydrodynamic pumping action pumps lubricant out of the indentations and over the pads, creating a uniform lip supporting film to reduce friction. A method of deforming and machining the sealing surface to produce the configuration is also disclosed.

4 Claims, 11 Drawing Figures

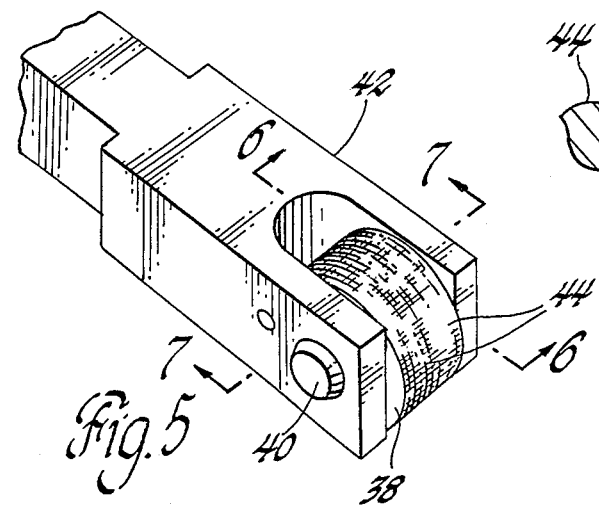
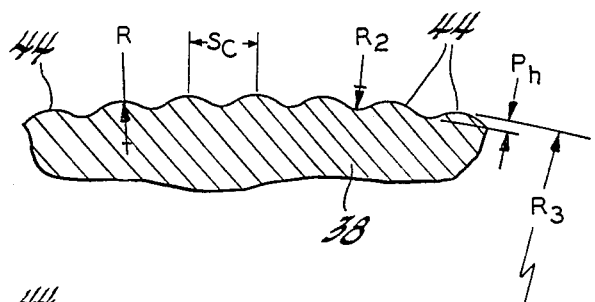
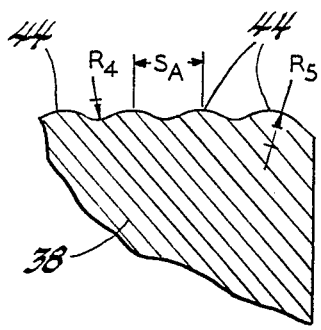
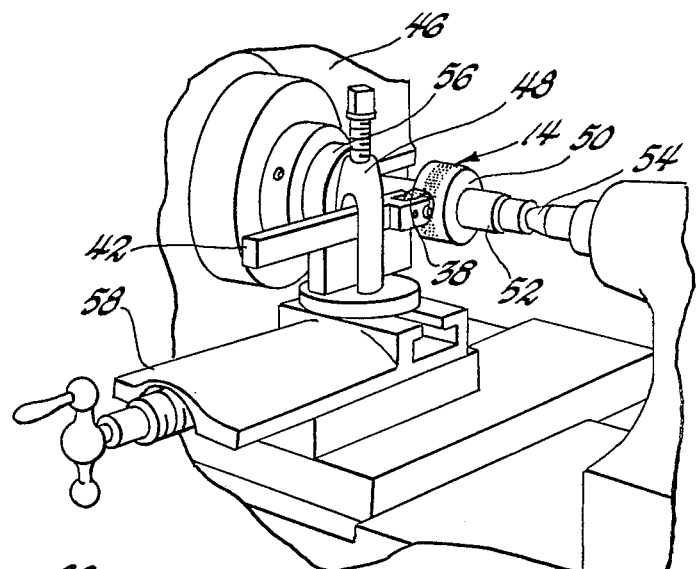
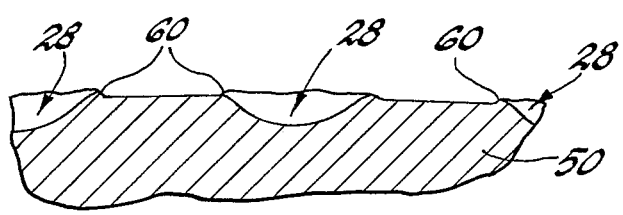
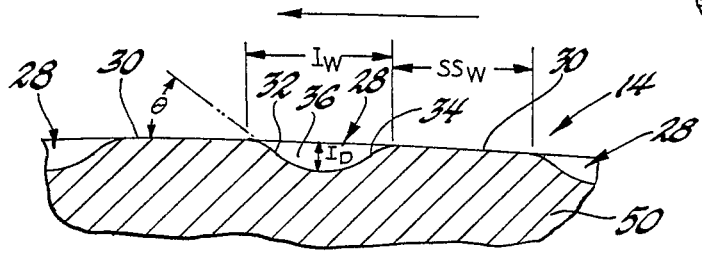
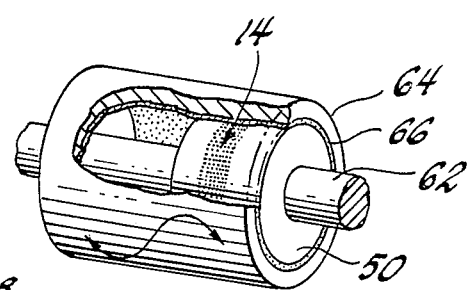

4,573,690

SEALING SURFACE AND METHOD

This invention relates to sealing surfaces and specifically to an improved, low friction configuration for a sealing surface and a method for its production.

BACKGROUND OF THE INVENTION

It has been recognized for some time that the lowest friction sealing surface is not to be achieved by grinding the surface to the absolute smoothest state possible. Research, especially in the case of sealing surfaces of a rotary shaft engaged by a radial seal, has shown that a certain degree of sealing surface irregularity actually decreases the friction between the lip of the seal and the shaft. A pressure buildup upstream of the surface irregularities followed by cavitations downstream results in a net positive pressure to create a lubricant film between the seal lip and the sealing surface. This hydrodynamic film of lubricant supports the lip on the sealing surface to prevent excessive friction therebetween. These surface irregularities are left by the grinding process, generally known as a plunge grinding operation, and are in the nature of minute projections or raised asperities. However, any pattern of raised projections, regular or random, has the inherent disadvantage of interconnected valleys around such projections which work against the formation of a supporting film, by providing paths of lesser resistance that divert oil from flowing over the projections.

Research by the Batelle Memorial Institute has shown that raised asperities in the shape of right circular cylinders, arranged in a uniform pattern on a flat annular surface, will reduce seal friction by creating a hydrodynamic film between the tops of the asperities and a seal. This hydrodynamic film is created by a series of cavitations caused by the asperities. Details of the research may be found in the March, 1966 issue of the *Journal of Basic Engineering*, at page 177. The same article suggests that right circular cylindrical depressions would behave in essentially the same fashion to create the same hydrodynamic film. Photo etching is the process suggested for forming the depressions. Such a process, besides being expensive, produces only sharp sided or undercut depressions, and depth control is difficult. As such, it is unsuitable for the invention to be discussed.

Other configurations for a sealing surface have been found to reduce seal friction. A method for cold working or peening a flat annular sealing surface may be found in the U.S. Pat. No. 4,441,349, assigned to the assignee of the present invention. Peening of the sealing surface of a rotary shaft has been tested and reported in a February, 1981 paper, "A Friction Reducing Shaft Surface for Use With Standard Radial Sharp Lip Seals", published by General Motors. A peened surface encourages the development of a hydrodynamic, seal supporting lubricant film and does not have the inherent disadvantage of raised asperities referred to above, being a series of depressions. Such a surface is produced by either firing shot at the sealing surface, or striking it with a series of rotary flappers with shot imbedded therein. A surface so created consists of a random series of crater-like depressions, and is not capable of exact reproducibility. Besides creating a random surface, peening may be a difficult process to carry out on certain sealing surfaces which are small or inaccessible. It may also be difficult to confine the peening to a limited area.

SUMMARY OF THE INVENTION

The improved sealing surface configuration and method of the invention provide a significant seal friction reduction compared to a standard ground surface, a reduction comparable to the peened surface referred to above. In addition, the sealing surface is uniform and repeatable, and the method for its production is easily adaptable to economical, volume production.

A body, a rotary shaft in the embodiment disclosed, has a cylindrical sealing surface relative to which the lip of a radial seal runs along a circular path. The lip runs in close enough proximity to the sealing surface that a film of lubricant therebetween may be sheared by the relative motion.

The improved configuration is a multiplicity of substantially identical indentations formed into the sealing surface and arranged in a uniform and repeatable pattern. Each of the indentations has a sloped wall that converges relative to the path of relative motion in the direction of the relative motion. Each indentation is also uniformly spaced a predetermined distance from each adjacent indentation along that path. This uniform spacing leaves a multiplicity of uniformly spaced sealed support pads comprised of that portion of the sealing surface between the indentations. The configuration for the sealing surface is thus regular, uniform and repeatable and may be easily formed and controlled, as discussed further below.

The indentations act as reservoirs for lubricant when there is no relative motion between the seal lip and the sealing surface. When there is relative motion, the shearing action will cause lubricant to be pumped from the indentations from a low pressure at the sloped wall to a higher pressure at the seal support pad. The smooth merging of the sloped walls of the indentations with the seal support pads allows the pumping to occur smoothly and without interruption or interference. The higher pressure of the lubricant film over the seal support pads supports the seal lip, thereby, reducing friction between the seal lip and the sealing surface.

This uniform sealing surface configuration may be produced by a method that is repeatable, controllable and suited to volume production. A cylindrical roller tool has a series of projections on its surface arranged in substantially the same pattern as that desired for the indentations described above. The upper portion of each projection is shaped to match the desired shape of the indentations. The roller tool is rolled along the sealing surface under pressure, thereby deforming the sealing surface and creating a multiplicity of indentations of the desired shape and uniform spacing, with unfinished seal support pads left therebetween. The deformation process leaves an area of raised sealing surface material around the perimeter of the indentations. The sealing surface is then machined sufficiently, such as by lapping or polishing, to remove those raised areas, thereby creating the desired smooth merger of the sloped walls with the seal support pads, as well as bringing the seal support pads to the desired level of smoothness. This process is easily repeated and controlled, as compared to the random nature inherent in a peened or standard ground surface.

It is, therefore, an object of the invention to provide an improved configuration for the sealing surface of a body in which a uniformly arranged pattern of indentations is provided in the sealing surface, each indentation having sloped walls converging relative to a path of relative motion between the sealing surface and the lip of a seal into a smooth merger with seal support pads between the indentations, whereby a shearing action caused by the relative motion of said seal lip and said sealing surface in a lubricant film pumps lubricant out of the indentations at a low pressure and over the seal support pads at a high pressure to provide load support to the seal lip as it moves.

It is another object of the invention to provide a method for producing the improved sealing surface configuration described which is repeatable and controllable.

It is yet another object of the invention to provide such a method in which the sealing surface of a body is deformed to create a multiplicity of indentations of the desired shape spaced uniformly along a path on the sealing surface, with each indentation having a wall sloping toward an unfinished seal support pad surrounded by a raised area of sealing surface material displaced during the deformation, followed by machining the sealing surface to remove the raised area so that each sloped wall merges smoothly with a respective seal support pad having the desired smoothness.

These and other objects and advantages of the invention will appear from the following written description and drawings in which:

FIG. 5 is a perspective view of the roller tool used to produce the improved seal surface configuration;

FIG. 6 is a cross-sectional view taken along the lines 6—6 of FIG. 5 with a portion thereof enlarged;

FIG. 7 is a cross-sectional view taken along the lines 7—7 of FIG. 5 with a portion thereof enlarged;

FIG. 8 shows the tool of FIG. 5 and illustrates the first step in a method;

FIG. 9 is an enlarged cross-sectional view of a portion of the sealing surface after the first step in the method.

FIG. 10 illustrates the second step of the method.

FIG. 11 is a view similar to FIG. 9 showing the sealing surface after the second step of the method.

DESCRIPTION OF THE PREFERRED EMBODIMENT

Figure 1:
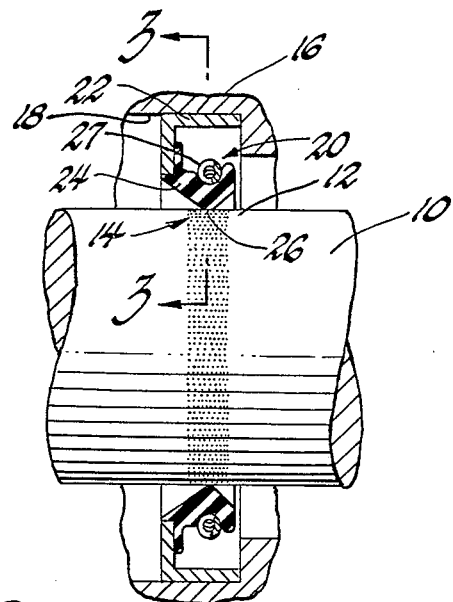
FIG. 1 shows a portion of a rotary shaft having a sealing surface with the improved configuration of the invention surrounded by a seal shown in cross section.
Figure 2:
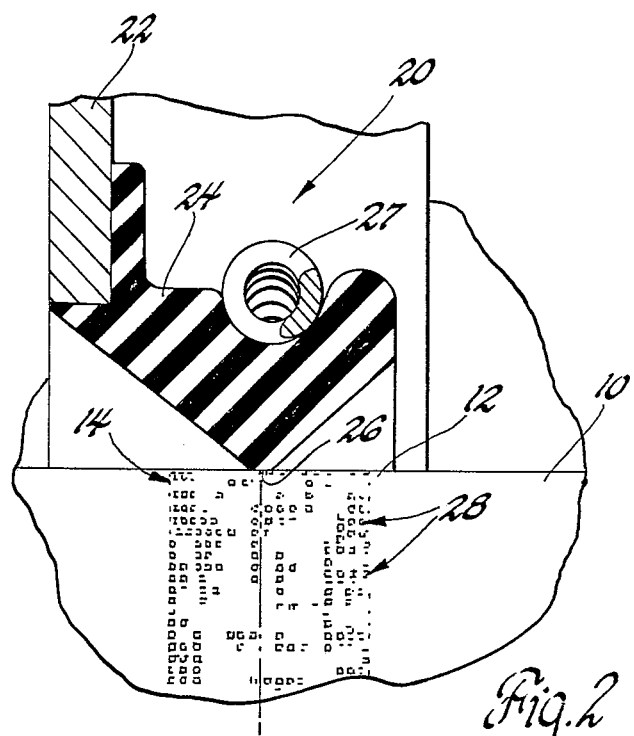
FIG. 2 is an enlargement of a portion of FIG. 1.

Referring first to FIG. 1, a body, a rotary shaft 10 in the embodiment disclosed, has a cylindrical sealing surface 12 that includes the improved surface configuration of the invention, designated generally at 14. A stationary body 16 includes a bore 18 in which an elastomeric radial seal of the garter spring type, designated generally at 20, is press fitted. Shaft 10 rotates within seal 20, although seal 20 could rotate relative to shaft 10, as well. Seal 20 maintains a reservoir of lubricant, not shown, to the right thereof. Further details may be seen in FIG. 2. Seal 20 includes a metal casing 22 and a body portion 24 molded thereto. Body portion 24 converges to a seal lip 26 that surrounds sealing surface 12, moving relative thereto as shaft 10 rotates along a path shown by the dotted line. A conventional garter spring 27 maintains a radial lip force of seal lip 26 on sealing surface 12. In the embodiment disclosed, the diameter of shaft 10 is 47.62 mm, and the width of the sealing surface configuration 14 is approximately 9 mm. The width of seal lip 26 is approximately 0.50 mm, so it is assured in normal operation that lip 26 will not move outside of the configuration 14 as shaft 10 rotates.

Figure 3:
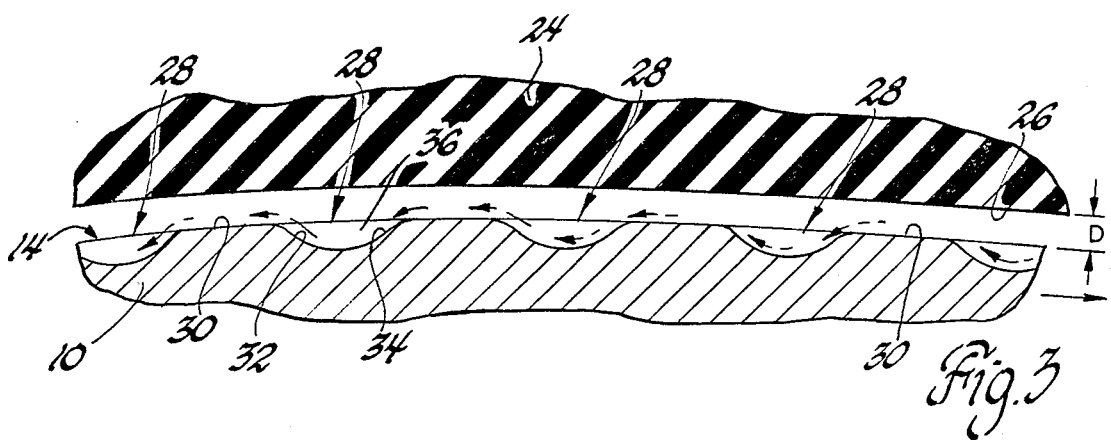
FIG. 3 is a cross-sectional view taken along the lines 3—3 of FIG. 1.

Referring next to FIG. 3, there may be seen an enlarged cross-section of lip 26 and the sealing surface configuration 14 taken along the path of relative motion therebetween. Lubricant drawn between lip 26 and sealing surface configuration 14 by capillary action is sheared and flows in a manner described below to create a hydrodynamic film that supports lip 26 with a gap D of about 1 micrometer. This film reduces the seal torque or friction with lip 26, without allowing significant lubricant leakage.

Referring again to FIG. 2, it may be seen that the improved sealing surface configuration 14 is a multiplicity of indentations designated generally at 28, formed into sealing surface 12 in a uniform and repeatable pattern. The pattern is essentially gridlike with a series of parallel rows that are also substantially parallel to the dotted line path of relative motion between seal lip 26 and sealing surface 12. Referring next to FIG. 11, one of the indentations 28 may be seen in greater detail. Indentations 28 are substantially identical to each other, with a substantially symmetrical bowl-like shape of width $I_w$ measured along the path of relative motion. Since indentations 28 are uniformly spaced along the path of relative motion, that portion of the sealing surface 12 left between them comprises a multiplicity of consequently uniformly spaced seal support pads 30 of width $SS_w$. Each indentation 28 has what may be referred to as a front sloped wall 32 that converges relative to the path of and direction of relative motion of seal lip 26 shown by the arrow. Sloped wall 32 merges smoothly with a respective seal support pad 30 adjacent thereto at an acute angle (theta) with no discontinuities or obstructions at the transition therebetween. Since each indentation 28 is symmetrical, each also has a rear sloped wall 34 with the same shape and angle, and a pair of similar side walls 36, one of which is visible in FIG. 11. The designation front or back is dependant only on the direction of relative motion, and were it reversed, the designations would be reversed as well.

The dimensions of the embodiment disclosed are satisfactory to provide the desired results. For example, a seal run on a plunge ground surface with a 0.39 micrometer $R_a$ surface roughness exhibited a seal torque, or friction, reduction of approximately 50% when run on a test bushing given the same sealing surface configuration 14 described above. The width of indentation 28, $I_w$, is approximately 0.263 mm, and is substantially the same in the direction perpendicular thereto, not shown. The depth, $I_d$, is approximately 0.025 mm, and the angle (theta) approximately 25°–30°. The width of seal support pad 30, $SS_w$, is, 0.188 mm. Given the diameter of shaft 10 of 47.62 mm, it will be apparent that each seal support pad 30 is essentially flat relative to each indentation 28. The surface smoothness of each seal support pad 30 is approximately 0.05 micrometers $R_a$, significantly smoother than the surface of a standard plunge ground shaft, which varies between 0.25 to 0.5 micrometers $R_a$.

Figure 4:
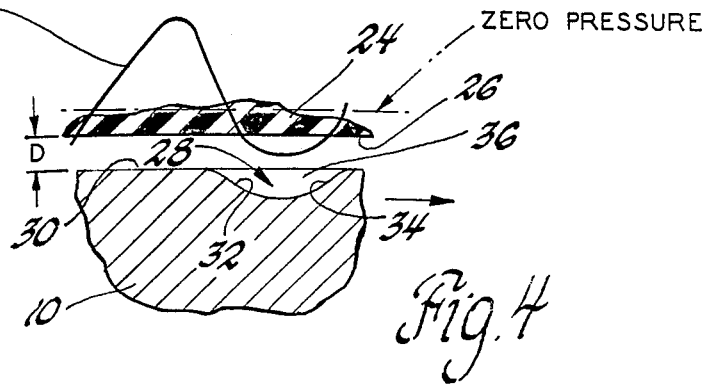
FIG. 4 is a portion of FIG. 3 showing the pressure distribution over one indentation and its respective seal support pad.

The operation of the invention may be understood by referring to FIG. 3. The lubricant will pool in indentations 28 when shaft 10 is stationary. As shaft 10 rotates clockwise, the consequent relative motion of lip 26 in close proximity to the converging front sloped walls 32 will, hydrodynamically, pump lubricant out of indentations 28, over front sloped walls 32, and over the adjacent seal support pads 30. The direction of the lubricant flow is shown by the dotted arrows. This pumping action, and the consequent flow of lubricant, is aided by the smooth merging of front sloped walls 32 with seal support pads 30. This pumping flow of lubricant creates a pressure differential shown graphically in FIG. 4. While the exact shape of the pressure curve is not known, the pressure curve shown is a good approximation, with a low pressure at the front sloped walls 32 and a higher pressure at the seal support pads 30. More of the pressure curve is shown above the 0 pressure line than below, indicating a consequent net positive pressure in the lubricant, and a consequent load supporting film that maintains gap D to prevent seal lip 26 from rubbing. In addition, the symmetry of indentation 28, with similar front and rear sloped walls 32 and 34, allows the same operation if the rotation is reversed. Another advantage of the invention is that, given the uniformity of the seal support pads 30, the load supporting fluid film formed thereover will consequently be uniform as seen by lip 26. It is also thought that the super smoothness of seal support pads 30 aids in the smoothness of the fluid flow. Pads 30 are significantly smoother than a standard plunge ground shaft, as discussed.

The invention may be contrasted with a peened surface which, in addition to its random nature, has a lip or crater-like wall of raised material around its indentations, which would detract from the smoothness of flow. The smooth pumping flow may also be contrasted with a sealing surface configuration having raised asperities, which causes vortices and cavitations in the fluid film. Also, as mentioned above, the interconnected valleys around the raised asperities encourage lubricant to leave the high pressure area over the asperities. Here, lubricant flowing over a seal support pad 30 into an adjacent indentation 28 is pumped back out over another pad 30. The improved sealing surface configuration 14 also has an inherent advantage over those sealing surfaces having raised asperities, or those having crater-like lips around indentations, in that no part of the configuration resides above the original sealing surface 12 of the shaft 10. Therefore, there is nothing created on which seal lip 26 would rub. While a photo etched indentation would reside below the original surface, it would have sharp corners due to the nature of the process.

A primary advantage of the invention over the sealing surfaces discussed is that the improved sealing surface configuration 14 is uniform and repeatable, and lends itself to economical volume production. The depth, slope and spacing of the indentations 28 of the invention may all be carefully controlled to develop an optimum oil film. The apparatus used to produce the invention may be seen in FIG. 5. It consists of a roller designated generally at 38 which is pivoted on pin 40 to a clevis shaped holder 42. The cylindrical outer surface of roller 38 is covered by a series of projections 44 arranged in a grid-like pattern. Basically, the convex projections 44 are shaped to match the concave indentations 28. The exact shape and spacing of the projections 44 is shown in FIGS. 6 and 7. Referring first to FIG. 6, the circumferential spacing between projections 44, $S_c$, is 0.45 mm. The radii of the projections 44 and the valleys therebetween, $R_1$ and $R_2$ respectively, are 0.25 mm and 0.10 mm. Projection height, denoted $P_h$, is 0.051 mm. Referring next to FIG. 7, the axial spacings of projections 44 is close to the circumferential spacing, 0.44 mm. $R_4$ and $R_5$, corresponding to $R_2$ and $R_1$, are 0.10 and 0.25 mm respectively. Therefore, projections 44 are essentially symmetrical in the circumferential and axial directions. Roller 38 is made from carpenter steel hardened to 60 to 64 Rockwell C, with a radius, $R_3$, of 8.6 mm. The axial length of roller 38 is 9.45 mm, and the edges may be chamfered as seen in FIG. 7.

The production of the sealing surface configuration 14 may be seen in FIGS. 8 through 11. Referring first to FIG. 8, a standard lathe 46 supports holder 42 in its tool support 48. A cored bushing 50 is supported on arbor 52 between tail stock 54 and the chuck 56 of lathe 46. Bushing 50 is of the same outside diameter and the same material as shaft 10, although the bushing 50 is itself used only for test purposes. The operation of a seal 20 in relation thereto would be the same, and volume production thereof would follow the same steps. The material for shaft 10, or bushing 50, could be 1018 or 4140 steel, although other materials are possible. The hardness of bushing 50 before deforming is 10 to 15 Rockwell C. After bushing 50 is in place as seen in FIG. 8, roller 38 is engaged with the surface thereof. Tool support 48 is moved in with cross slide 58 until projections 44 have a 0.38 mm interference with the surface of bushing 50. Bushing 50 is then turned by lathe 46, and the engagement of projections 44 therewith leaves a pattern of indentations 28 as seen in FIG. 9, surrounded by a raised area or lip of metal 60 displaced in the deforming process. As shown, roller 38 is run for a single pass. Should it be desired to create a pattern of indentations wider than roller 38, then roller 38 could be fed in with a machine lead equal to the axial spacing of projections 44, that being 0.44 mm. After deforming, bushing 50 is hardened to 35 to 45 Rockwell C.

The next step in the method is shown in FIG. 10. Bushing 50 is supported on a rod 62 and is run back and forth with a twisting motion within a cast iron lapping tool 64 having an internal diameter slightly larger than the outside diameter bushing 50. An aluminum oxide grit 66, size number 1,000, is used as an abrasive. This lapping process is carried out until the lip 60 of raised material is removed and until the seal support pads 30 have the desired smoothness described above. Another machining process better suited to volume production could be used to remove lip 60 in actual practice. It will be appreciated that this method is easily repeatable and uniform, as opposed to the peening process which has a certain amount of inherent randomness. The method is also well suited for confining the sealing surface configuration 14 to a limited, controlled area of shaft 10 as wide or as narrow as desired.

A similar configuration could be used for an annular sealing surface used with an annular face seal. While the annular sealing surface is flat, as opposed to the cylindrical surface of the shaft, the indentations 28 and seal support pads 30 are small enough in relation to the diameter of shaft 10 that seal support pads 30 are essentially flat relative to the indentations 28. Therefore, a planar, annular pattern of similar indentations would operate in similar fashion to a cylindrical pattern. These indentations would be in circular, concentric rows, with adjacent indentations in each row substantially uniformly spaced from each other with seal support pads between. If the number of rows was not great, the diameter of the outer rows would not be that much larger than the inner. Therefore, using the same number of indentations in each row would not increase the width of the seal support pads in the larger diameter rows by much. Alternatively, each row of larger diameter could be made to include more indentations to maintain substantially the same seal support pad width. The path of relative motion of the annular face seal would be concentric with, and contained within, the rows of indentations.

The indentations could be formed by the same method, that is, surface deformation followed by lapping. A different tool than that described above would be more practical. One possibility would be a steel block with a series of projections similar to the projections 44, but with one projection for each indentation, and arranged in a flat annular ring in the same pattern desired for the indentations. This could then be pressed into the annular sealing surface with a suitable hydraulic press, thereby deforming the surface to the configuration desired in one step. Another possibility would be a roller of conical section to create an annular pattern as it rolled. Lapping would then be done by a flat abrasive tool.

Therefore, it will be appreciated that the invention is capable of embodiments other than that disclosed, and is not intended to be limited to that disclosed.

We claim:

1. An improved configuration for the sealing surface of a body movable relative to the lip of a seal along a path in one direction and in close proximity to said lip so as to be capable of shearing a lubricant between said lip and said sealing surface, comprising;
    a multiplicity of substantially identical indentations formed into said sealing surface as said configuration, each indentation having a sloped wall converging relative to said path in said one direction and merging smoothly with said sealing surface, each indentation having a predetermined uniform spacing along said path from each adjacent indentation so as to create a multiplicity of uniformly spaced seal support pads between the indentations,
    whereby the shearing action caused by said seal lip moving relative to said sealing surface pumps lubricant from said indentations at a low pressure at said sloped walls to a higher pressure at said seal support pads due to the smooth merging of said sloped walls with said sealing surface, the predetermined uniform spacing between the indentations serving to maintain substantially the same higher pressure over each seal support pad to thereby provide load support to said moving seal lip.

2. An improved configuration for the sealing surface of a body movable relative to the lip of a seal along a path in either of two directions so as to be capable of shearing a lubricant between said lip and said sealing surface, comprising;
    a multiplicity of substantially identical indentations formed into said sealing surface as said configuration, each indentation having a sloped front and rear wall each converging relative to said path in one of said directions and merging smoothly with said sealing surface, each indentation having a predetermined uniform spacing along said path from each adjacent indentation so as to create a multiplicity of uniformly spaced seal support pads between the indentations,
    whereby the shearing action caused by said seal lip moving relative to said sealing surface in either direction pumps lubricant from said indentations at a low pressure at one of said front and rear sloped walls to a higher pressure at said seal support pads due to the smooth merging of said sloped walls with said sealing surface, the predetermined uniform spacing between the indentations serving to maintain substantially the same higher pressure over each seal support pad to thereby provide load support to said moving seal lip.

3. A method of providing an improved configuration for the sealing surface of a body movable relative to the lip of a seal along a path with respect to said sealing surface, comprising the steps of;
    deforming the sealing surface of said body to create a multiplicity of indentations therein spaced uniformly along said path to define seal support pads therebetween, with each indentation having at least one wall sloping toward a respective seal support pad and separated therefrom by a raised area of sealing surface material displaced in deforming the sealing surface,
    machining said sealing surface sufficiently to remove said raised areas to thereby create a smooth merging of said sloped wall with its respective seal support pad.

4. A method of providing an improved configuration for the sealing surface of a body movable relative to the lip of a seal along a path with respect to said sealing surface, comprising the steps of;
    providing the surface of a tool with hardened projections having a predetermined convex shape and arranged in a pattern relative to the tool substantially similar to the desired configuration for the sealing surface,
    engaging the hardened projections of said tool with the sealing surface of said body with a predetermined interference to thereby deform said sealing surface to create a multiplicity of indentations in the desired pattern spaced uniformly along said path to define seal support pads therebetween, with each indentation having a concave shape substantially matching the convex shape of a projection with at least one wall sloping toward a respective seal support pad and separated therefrom by a raised area of sealing surface material displaced in deforming the sealing surface,
    machining said sealing surface sufficiently to remove said raised areas to thereby create a smooth merging of said sloped wall with its respective seal support pad.

* * * * *